United States Patent
Ye et al.

(10) Patent No.: US 9,772,521 B2
(45) Date of Patent: Sep. 26, 2017

(54) FLAT PANEL DISPLAY

(71) Applicants: Shanghai AVIC Optoelectronics Co., Ltd., Shanghai (CN); Tianma Micro-Electronics Co., Ltd., Shenzhen (CN)

(72) Inventors: Zhou Ye, Shanghai (CN); Zhaokeng Cao, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/192,700

(22) Filed: Feb. 27, 2014

(65) Prior Publication Data
US 2015/0055068 A1    Feb. 26, 2015

(30) Foreign Application Priority Data

Aug. 26, 2013 (CN) .......................... 2013 1 0375928

(51) Int. Cl.
*G02F 1/1335* (2006.01)
*G02F 1/1343* (2006.01)

(52) U.S. Cl.
CPC .. *G02F 1/133514* (2013.01); *G02F 1/134363* (2013.01); *G02F 2001/134345* (2013.01); *G02F 2001/134372* (2013.01)

(58) Field of Classification Search
CPC combination set(s) only.
See application file for complete search history.

(56) References Cited

U.S. PATENT DOCUMENTS

| | | | |
|---|---|---|---|
| 2007/0058115 A1* | 3/2007 | Utsumi | G02F 1/133514 349/109 |
| 2008/0100762 A1* | 5/2008 | Onogi | G02F 1/134363 349/39 |
| 2008/0143897 A1* | 6/2008 | Chang | G02F 1/134363 349/33 |

(Continued)

FOREIGN PATENT DOCUMENTS

| | | |
|---|---|---|
| CN | 1982953 A | 6/2007 |
| JP | 2000187231 A | 7/2000 |
| KR | 20100122404 A | 11/2010 |

OTHER PUBLICATIONS

Han et al., Fringe Field Type Liquid Crystal Display Device and Method of Fabricating the Same, Machine translation of KR 10-2010-0122404 A from KIPRIS website, All pages.*

(Continued)

*Primary Examiner* — Dennis Y Kim
(74) *Attorney, Agent, or Firm* — Alston & Bird LLP

(57) ABSTRACT

A flat panel display is disclosed. The display includes an array substrate, and a color filter substrate. The array substrate includes a plurality of pixel units, and each pixel unit includes at least three sub-pixels. The color filter substrate is placed opposite to a pixel array and includes a red resist, a green resist and a blue resist which respectively correspond to the sub-pixels. A ratio of thicknesses of the red, green and blue resists is configured in such a way that a ratio of total transmittances of the sub-pixels corresponding to the red, green and blue resists has a preset value.

6 Claims, 4 Drawing Sheets

(56) References Cited

U.S. PATENT DOCUMENTS

| | | | |
|---|---|---|---|
| 2009/0115952 A1* | 5/2009 | Nakamura | G02B 5/201 349/143 |
| 2010/0066952 A1* | 3/2010 | Tsuchiya et al. | 349/106 |
| 2010/0171910 A1 | 7/2010 | Liu et al. | |
| 2010/0182549 A1 | 7/2010 | Miyashita | |
| 2010/0207858 A1 | 8/2010 | Chen et al. | |
| 2010/0238389 A1* | 9/2010 | Chan | G02F 1/133514 349/107 |
| 2011/0102714 A1* | 5/2011 | Lee et al. | 349/105 |
| 2011/0279758 A1 | 11/2011 | Yuh et al. | |
| 2012/0008073 A1* | 1/2012 | Ota | 349/106 |

OTHER PUBLICATIONS

German Application No. 102014203555.4, First Office Action dated Feb. 27, 2017.

* cited by examiner

FLAT PANEL DISPLAY

CROSS-REFERENCES TO RELATED APPLICATIONS

This application claims the benefit of priority to Chinese Patent Application No. 201310375928.3, filed with the Chinese Patent Office on Aug. 26, 2013 and entitled "FLAT PANEL DISPLAY", the contents of which is incorporated herein by reference in its entirety.

TECHNICAL FIELD

The present application relates to the field of flat panel displays, in particular to pixel units and a color filter substrate in a Fringe Field Switching (FFS) Liquid Crystal Display.

BACKGROUND OF THE INVENTION

A flat panel display such as an FFS Liquid Crystal Display has become the trend of display technology development. The FFS technology is that a fringe electric field generated between pixel electrodes and a common electrode of a Thin-Film Transistor (TFT) substrate enables liquid crystal molecules between the electrodes and above the electrodes to rotate on a plane parallel to a glass substrate. The pixel electrodes and the common electrode are made of transparent conductors, so that the transmittance of the Liquid Crystal Display is improved.

The transmittance of the Liquid Crystal Display further depends on both factors of an electrode width and a width of a gap between electrodes in a pixel unit. If the electrode width is increased, the transmittance is decreased; and if the width of gap between the electrodes is increased, the transmittance is decreased because the liquid crystal molecules under the gap cannot be driven. By decreasing merely the electrode width or the width of the gap between the electrodes, although the pixel transmittance is improved, the difference between the transmittances of various pixels causes a color shift phenomenon.

BRIEF SUMMARY OF THE INVENTION

One inventive aspect is a flat panel display. The display includes an array substrate, and a color filter substrate. The array substrate includes a plurality of pixel units, and each pixel unit includes at least three sub-pixels. The color filter substrate is placed opposite to a pixel array and includes a red resist, a green resist and a blue resist which respectively correspond to the sub-pixels. A ratio of thicknesses of the red, green and blue resists is configured in such a way that a ratio of total transmittances of the sub-pixels corresponding to the red, green and blue resists has a preset value.

DETAILED DESCRIPTION OF THE INVENTION

Referring to FIGS. 1 to 4, a flat panel display 1000 provided by a first embodiment of the present disclosure is shown.

Figure 1:
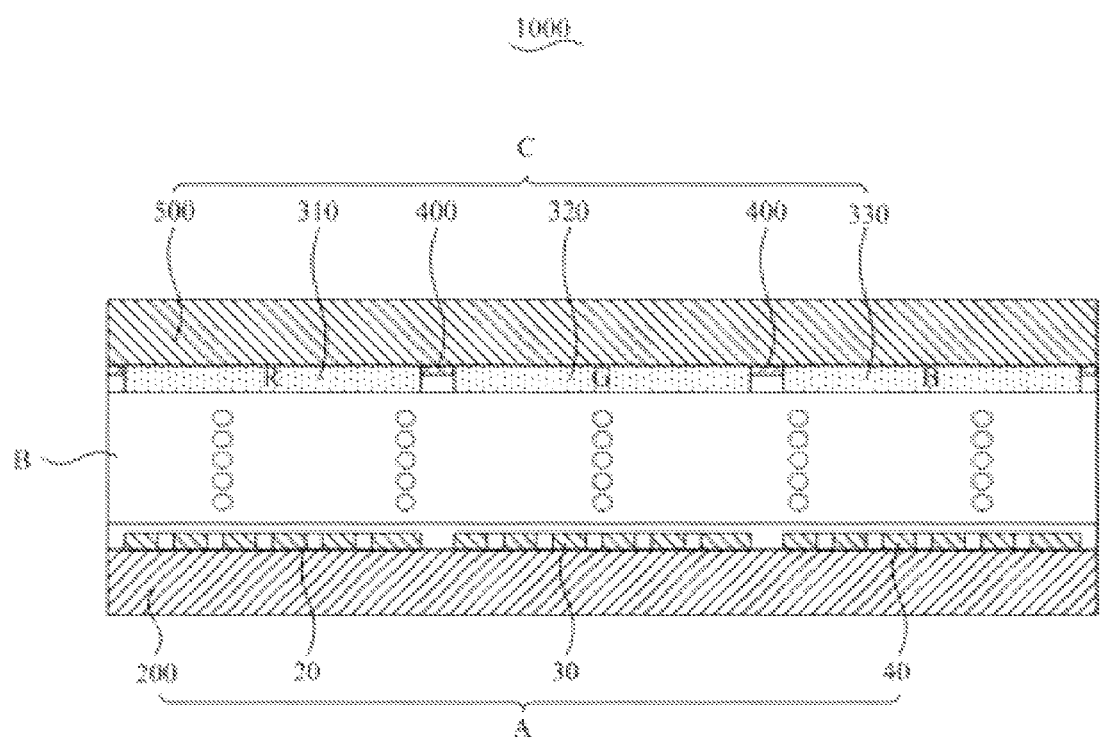
FIG. 1 is a schematic diagram showing the structure of a flat panel display according to a first embodiment of the present disclosure.

FIG. 1 is a schematic diagram showing the partial cross-section of the flat panel display 1000. The flat panel display 1000 includes an array substrate A, a liquid crystal layer B and a color filter substrate C. The liquid crystal layer B is located between the array substrate A and the color filter substrate C. The flat panel display 1000 is an FFS Liquid Crystal Display in the present embodiment.

Figure 2:
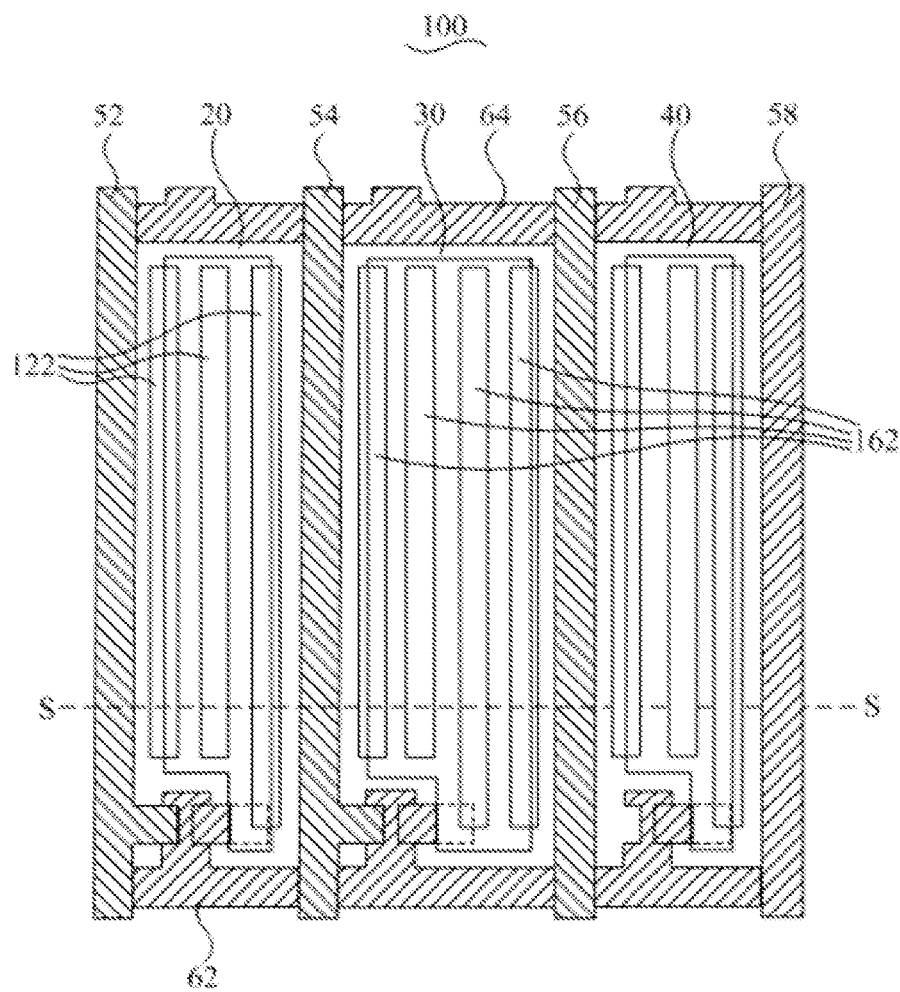
FIG. 2 is a schematic top view showing a pixel unit in the flat panel display according to the first embodiment of the present disclosure.
Figure 3:
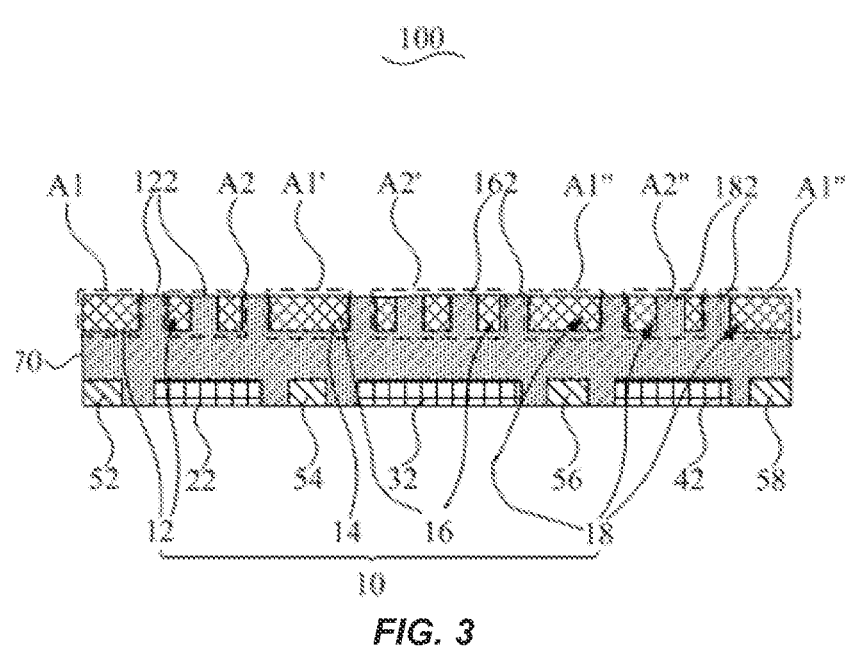
FIG. 3 is a schematic sectional diagram taken along a line SS in FIG. 2.

The array substrate A shown in FIGS. 1 to 3 includes a plurality of pixel units 100 and a substrate 200, but only one pixel unit 100 is shown as an example in the figures. The substrate 200 is located at the bottom of the flat panel display. The pixel unit 100 includes a common electrode 10, a first sub-pixel 20, a second sub-pixel 30, a third sub-pixel 40, and pixel electrodes 22, 32 and 42.

Four data lines 52, 54, 56 and 58, which are spaced from each other, are arranged in parallel along a vertical direction. Two scanning lines 62, 64, which are spaced from each other, are arranged in parallel along a horizontal direction. Data lines 52, 54, 56 and 58 intersect with the scanning lines 62, 64, thereby forming three quadrilateral regions, which are defined as a first sub-pixel 20, a second sub-pixel 30 and a third sub-pixel 40, respectively.

The pixel electrodes 22, 32, and 42 are located within the first sub-pixel 20, the second sub-pixel 30 and the third sub-pixel 40, respectively. The pixel electrodes 22, 32, and 42 are located at the same layer as the data lines 52, 54, 56 and 58, and an insulating layer 70 is provided between the pixel electrodes 22, 32, and 42 and the common electrode 10.

The common electrode 10 has a plane shape and is laid above the sub-pixels 20, 30, and 40. Depending on the sub-pixels 20, 30, and 40, the common electrode 10 can be divided into various regions including a region surrounded by a common electrode portion 12 and a common electrode portion 14, a region surrounded by the common electrode portion 14 and a common electrode portion 16, and a region surrounded by the common electrode portion 16 and a common electrode portion 18. The common electrode portion 12 is located above the first sub-pixel 20, the common electrode portion 14 is located above the part between the sub-pixel 20 and the sub-pixel 30, the common electrode portion 16 is located above the second sub-pixel 30, and the common electrode portion 18 is located above the third sub-pixel 40. The common electrode portion 12 further includes a first part A1 which is located at a position where the common electrode portion 12 and the data line 52 overlap, and a second part A2 which is located at a position where the common electrode portion 12 and the pixel electrode 22 overlap. The common electrode portion 16 further includes a first part A1' which is located at a position where the common electrode portion 14 and the data line 54 overlap, and a second part A2' which is located at a position where the common electrode portion 16 and the pixel electrode 32 overlap. The common electrode portion 18 further includes a first part A1" which is located at a position where the common electrode portion 18 and the data lines 56, 58 overlap, and a second part A2" which is located at a position where the common electrode portion 18 and the pixel electrode 42 overlap. The width of the first part A1 of the common electrode portion 12 is larger than the width of the data line 52. The width of the common electrode portion 14 is larger than the width of the corresponding data line 54. The width of the first part A1" of the common electrode portion 18 is larger than the width of the data lines 56, 58. With such configured widths, the common electrode portions 12, 14, 16 and 18 respectively shield the electric fields of the corresponding data lines 52, 54, 56 and 58, to prevent the data lines 52, 54, 56 and 58 from affecting the rotation of the liquid crystal molecules. The second part A2 (A2', A2") of the common electrode portion 12 (16, 18) has a width of 2~4 μm. Three through grooves 122 are provided in the region between the common electrode portion 12 and the common electrode portion 14, namely above the corresponding first sub-pixel 20. Four through grooves 142 are provided in the region between the common electrode portion 14 and the common electrode portion 16, namely above the corresponding second sub-pixel 30. Three through grooves 182 are provided in the region between the common electrode portion 16 and the common electrode portion 18, namely above the corresponding third sub-pixel 40. The grooves 122, 162 and 182 each have the same width of 4~5 μm. Therefore, the first sub-pixel 20 and the third sub-pixel 40 have the same area which is smaller than the area of the second sub-pixel 30.

In the prior art, each of sub-pixels in the pixel unit has the same area and is provided with the same number of through grooves, thus there is no color shift, and the ratio of total transmittances of the respective sub-pixels in the pixel unit is defined as a preset value. The total transmittance herein refers to the total transmittance of the sub-pixel in the pixel unit after the array substrate is configured with a color filter substrate. Since all the sub-pixels in the pixel unit 100 are not provided with the same number of through grooves and do not have same area, for example, each of the sub-pixels is provided with three or four through grooves, so that the aperture ratio of the second sub-pixel 320 (which corresponds to four through grooves) is larger than the aperture ratio of the first or third sub-pixel 310, 330 (which corresponds to three through grooves), and hence the ratio of the total transmittances of the respective sub-pixels has a value which is different from the preset value in the prior art, and the flat panel display may suffer from the color shift phenomenon because the displayed color represented by the second sub-pixel is stronger.

Figure 4:
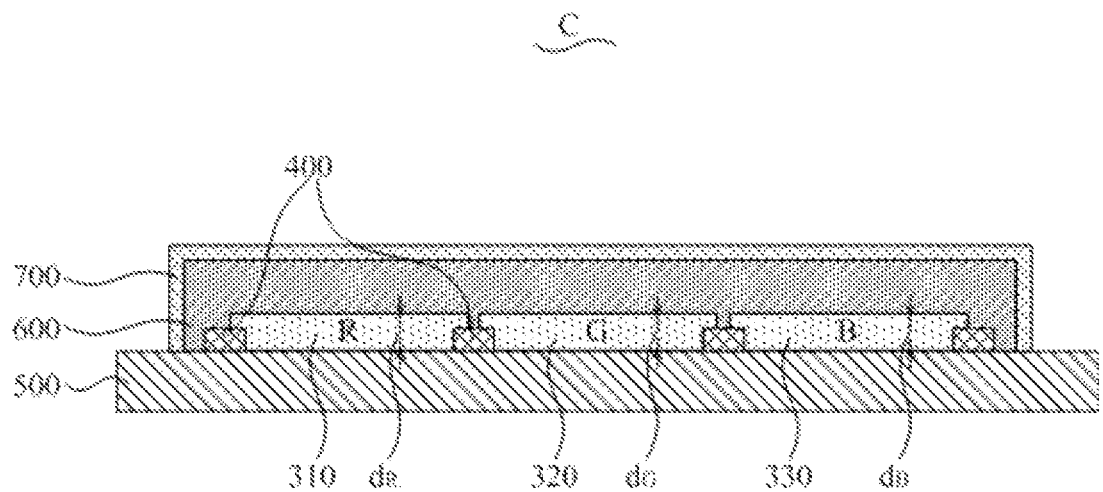
FIG. 4 is a schematic sectional diagram of a color filter substrate in the flat panel display according to the first embodiment of the present disclosure.

Reference is made to FIG. 4, which is a schematic sectional diagram showing the color filter substrate C, but only a part of the color filter substrate C is shown. The color filter substrate C includes three color resists 310, 320 and 330, four black matrixes 400, a substrate 500, an Indium Tin Oxide (ITO) layer 600 and an overcoat OC protection layer 700. The color resists include a red resist 310, a green resist 320 and a blue resist 330. The black matrixes 400 are respectively located between the color resists. Here, the red resist 310 corresponds to the sub-pixel 20, the green resist 320 corresponds to the sub-pixel 30 and the blue resist 330 corresponds to the sub-pixel 40. The ITO layer 600 is located above the red, green and blue resists (310, 320 and 330) and the black matrixes 400, and the OC protection layer 700 covers the ITO layer 600. Hereinafter, three colors of red, green and blue are represented by R, G and B, respectively.

The color filter substrate C is used for optical compensation of the array substrate A in the flat panel display 1000 to avoid the color shift phenomenon by the principles described below.

In flat panel display 1000, the total transmittance of the sub-pixel further depends on the color resist transmittance in addition to the pixel aperture ratio. Herein, the total transmittances of the sub-pixels are denoted by $T_1$, $T_2$ and $T_3$, respectively, the pixel aperture ratios are denoted by $A_1$, $A_2$ and $A_3$, respectively, the color resist transmittances are denoted by $T_R$, $T_G$ and $T_B$, respectively, and the thicknesses of the color resists are denoted by $d_R$, $d_G$ and $d_B$, respectively.

If the ratio of the total transmittances of the sub-pixels of the respective colors has the preset value, the light emitted by the sub-pixels can be combined to form white light without color shift phenomenon. In the case that the product of the pixel aperture ratio $A_1$ ($A_2$, $A_3$) of a sub-pixel and the color resist transmittance $T_R$ ($T_G$, $T_B$) of the sub-pixel is a fixed value, the total transmittance $T_1$ ($T_2$, $T_3$) of the sub-pixel is of a fixed value, that is, the ratio of the total transmittances of the sub-pixels of the respective colors has the above preset value, and the color shift phenomenon is avoided.

The thickness $d_R$ ($d_G$, $d_B$) of the color resist 310 (320, 330) is inversely proportional to the transmittance $T_R$ ($T_G$, $T_B$) of the color resist in the color filter substrate C. That is, the larger the thickness $d_R$ ($d_G$, $d_B$) of the color resist 310 (320, 330) is, the lower the transmittance $T_R$ ($T_G$, $T_B$) of the color resist is. In the pixel unit 100, due to the fact that the aperture ratio $A_2$ of the second sub-pixel 30 is larger, the thickness $d_G$ of the color resist 320 corresponding to the second sub-pixel 30 is increased accordingly to reduce the transmittance $T_G$ of the color resist, so that the product of the pixel aperture ratio $A_2$ and the transmittance $T_G$ of the color resist is maintained unchanged in the second sub-pixel 320. At the same time, neither the thickness $d_R$ of the color resist 310 corresponding to the first sub-pixel 20 nor the thickness $d_B$ of the color resist 330 corresponding to the third sub-pixel 40 is changed. Therefore, the ratio of the transmittances $T_1$, $T_2$, $T_3$ of the sub-pixels of the respective colors has the preset value to avoid the color shift phenomenon.

Alternatively, the thicknesses $d_R$ and $d_B$ of the color resists 310 and 330 respectively corresponding to the first sub-pixel 20 and the third sub-pixel 40 are both reduced by the same ratio, in order to improve the transmittances $T_R$ and $T_B$ of the color resists 310 and 330, and hence to increase the product of the pixel aperture ratio $A_1$ and the transmittance $T_R$ of the color resist 310 as well as the product of the pixel aperture ratio $A_3$ and the transmittance $T_B$ of the color resist 330, without changing the thickness $d_G$ of the color resist 320 corresponding to the second sub-pixel 30, namely, the product of the pixel aperture ratio $A_2$ and the transmittance $T_G$ of the color resist 320 is maintained unchanged. Therefore, the ratio of the total transmittances $T_1$, $T_2$, $T_3$ of the sub-pixels of the respective colors has the preset value to avoid the color shift phenomenon.

The following Tables 1 and 2 show data obtained from simulation experiments using an optical simulation software (such as EXPERT-LCD) to illustrate the effect of optical compensation according to a first embodiment of the present disclosure.

Table 1 shows data obtained in the case where the flat panel display includes the array substrate A according to a first embodiment of the present disclosure and is provided with the existing color filter substrate in the prior art, wherein the thickness of color resists of the color filter substrate is fixed. Table 2 shows data obtained in the case of the flat panel display 1000 according to a first embodiment of the present disclosure, wherein the thickness of the color resist of the color filter substrate B is adjusted.

TABLE 1

| Array/Cell parameters | | | Maximum | Typical value | Minimum |
|---|---|---|---|---|---|
| Aperture ratio (%) | | | 100.00% | 95.00% | 90.00% |
| Panel transmittance (%) | | | 5.55% | 5.27% | 4.99% |
| Cell gap (um) | | | | 4.50 | |
| Red coordinate Rx | 0.594 | Red coordinate u' (R) | 0.417 | | |
| Red coordinate Ry | 0.324 | Red coordinate v' (R) | 0.512 | | |
| Green coordinate Gx | 0.295 | Green coordinate u' (G) | 0.131 | | |
| Green coordinate Gy | 0.552 | Green coordinate v' (G) | 0.550 | | |
| Blue coordinate Bx | 0.138 | Blue coordinate u' (B) | 0.128 | | |
| Blue coordinate By | 0.133 | Blue coordinate v' (B) | 0.277 | | |
| White coordinate Wx | 0.298 | | | | |
| White coordinate Wy | 0.357 | | | | |
| Chroma domain | 51.01% | | | | |

TABLE 2

| Array/Cell parameter | | | Maximum | Typical value | Minimum |
|---|---|---|---|---|---|
| Aperture ratio (%) | | | 100.00% | 95.00% | 90.00% |
| Panel transmittance (%) | | | 5.12% | 4.86% | 4.61% |
| Cell gap (um) | | | | 4.50 | |
| Red coordinate Rx | 0.597 | Red coordinate u' (R) | 0.422 | | |
| Red coordinate Ry | 0.321 | Red coordinate v' (R) | 0.510 | | |
| Green coordinate Gx | 0.292 | Green coordinate u' (G) | 0.129 | | |
| Green coordinate Gy | 0.556 | Green coordinate v' (G) | 0.551 | | |
| Blue coordinate Bx | 0.145 | Blue coordinate u' (B) | 0.132 | | |
| Blue coordinate By | 0.139 | Blue coordinate v' (B) | 0.286 | | |
| White coordinate Wx | 0.286 | | | | |
| White coordinate Wy | 0.326 | | | | |
| Chroma domain | 51.08% | | | | |

The white color is obtained by combining the light emitted from all the sub-pixels of three colors of red, green and blue, and the color shift in any one of the red, green and blue colors will directly affect the white color. Therefore, the occurrence of the color shift phenomenon may be determined by comparing white coordinates (Wx, Wy). The white coordinate Wx has a value of a present range of 0.298±0.02 and the white coordinate Wy has a value of a present range of 0.331±0.02 in the simulated experiment. As shown in Table 1, the white coordinate Wx has a value of 0.298 and the white coordinate Wy has a value of 0.357, thus the value of the white coordinate Wy is deviated by 0.026. As it can be seen, if the color filter substrate of the prior art is used, and the thickness of the color resist is not adjustable, then the color shift may happen to the flat panel display. As shown in Table 2, the white coordinate Wx has a value of 0.286 and the white coordinate Wy has a value of 0.326, thus the value of the white coordinate Wx is deviated by 0.012 which is within an allowed tolerance, and the value of the white coordinate Wy is offset by 0.005 which is also within an allowed tolerance. As it can be seen from the flat panel display 1000 of a first embodiment of the present disclosure, the thicknesses $d_R$, $d_G$ and $d_B$ of the color resists in the color filter substrate C are adjusted, the ratio of the total transmittances $T_1$, $T_2$ and $T_3$ of the respective sub-pixels 310, 320 and 330 of the three colors R, G and B has the preset value so that the color shift phenomenon can be avoided.

In a first embodiment of the present disclosure, the color filter substrate C is placed opposite to the array substrate A, and the thicknesses of the color resists are adjusted so that the ratio of the total transmittances $T_1$, $T_2$ and $T_3$ of the respective sub-pixels 310, 320 and 330 corresponding to the color resists in the pixel unit 100 has the preset value, thus the pixel unit 100 will not be subjected to the color shift. Therefore, any color shift happened to the entire flat panel display 1000 is avoided.

Figure 5:
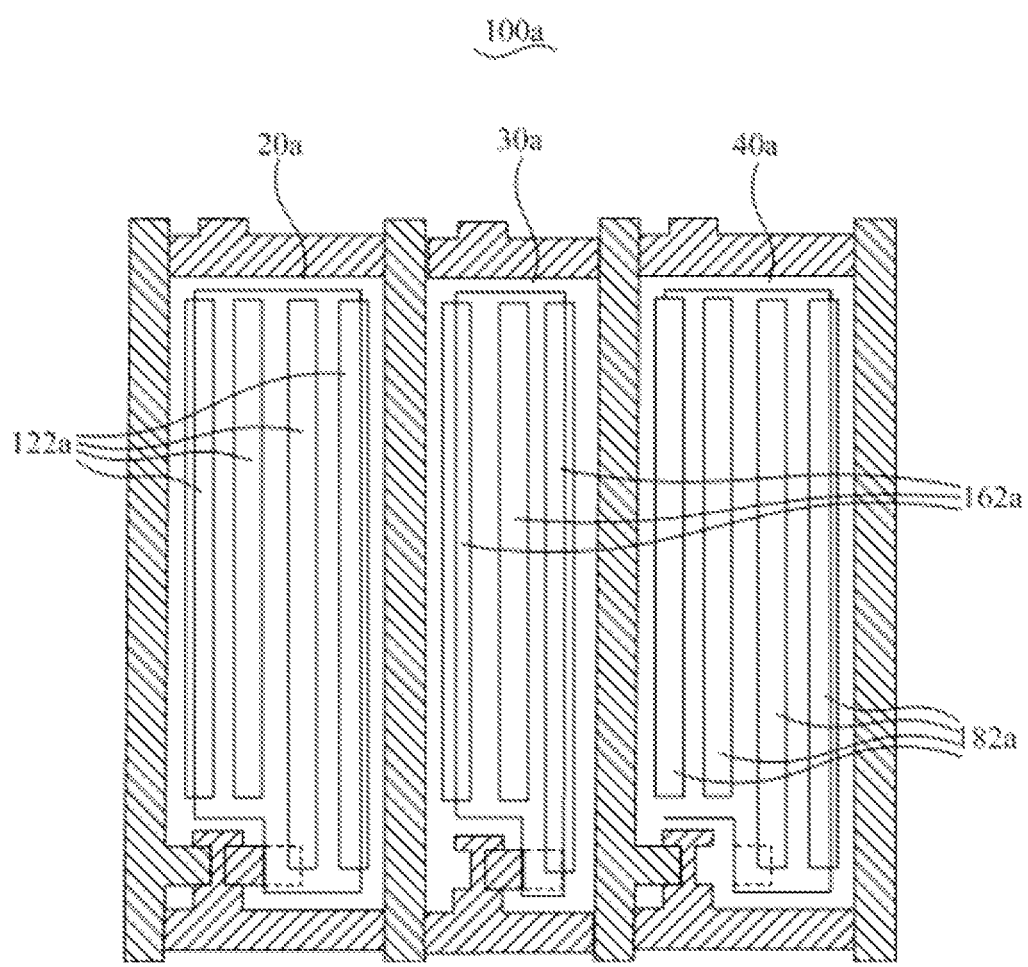
FIG. 5 is a schematic top view showing a pixel unit provided by a second embodiment of the present disclosure.

Referring to FIG. 5, a second embodiment of the present disclosure further provides another pixel unit 100*a*. The position of the pixel unit 100*a* in the flat panel display and the structure of the pixel unit 100*a* are the same as those in the first embodiment of the present disclosure, hence there is no further description herein. The difference of the second embodiment from the first embodiment is that, although the pixel unit 100*a* also includes three sub-pixels 20*a*, 30*a* and 40*a*, the number of through grooves arranged in the common electrode portion corresponding to each of the sub-pixels 20*a*, 30*a* and 40*a* is different from that in the first embodiment, that is, the first sub-pixel 20*a* corresponds to four through grooves, the third sub-pixel 40*a* corresponds to four through grooves, and the second sub-pixel 30*a* corresponds to three through grooves. In this case, the aperture ratios of the first and third sub-pixels are higher than that of the second sub-pixel.

The pixel unit 100*a* of a second embodiment of the present disclosure operates in the same principle as that of the first embodiment of the present disclosure, and optical compensation is performed by adjusting the thickness of the color resist.

Although three or four through grooves are arranged in the common electrode portion corresponding to the sub-pixel of the pixel unit 100 (100a) in the first and second embodiments of the present disclosure, but the present invention is not limited thereto, and the number of the through grooves can be varied as desired in practice.

Figure 6:
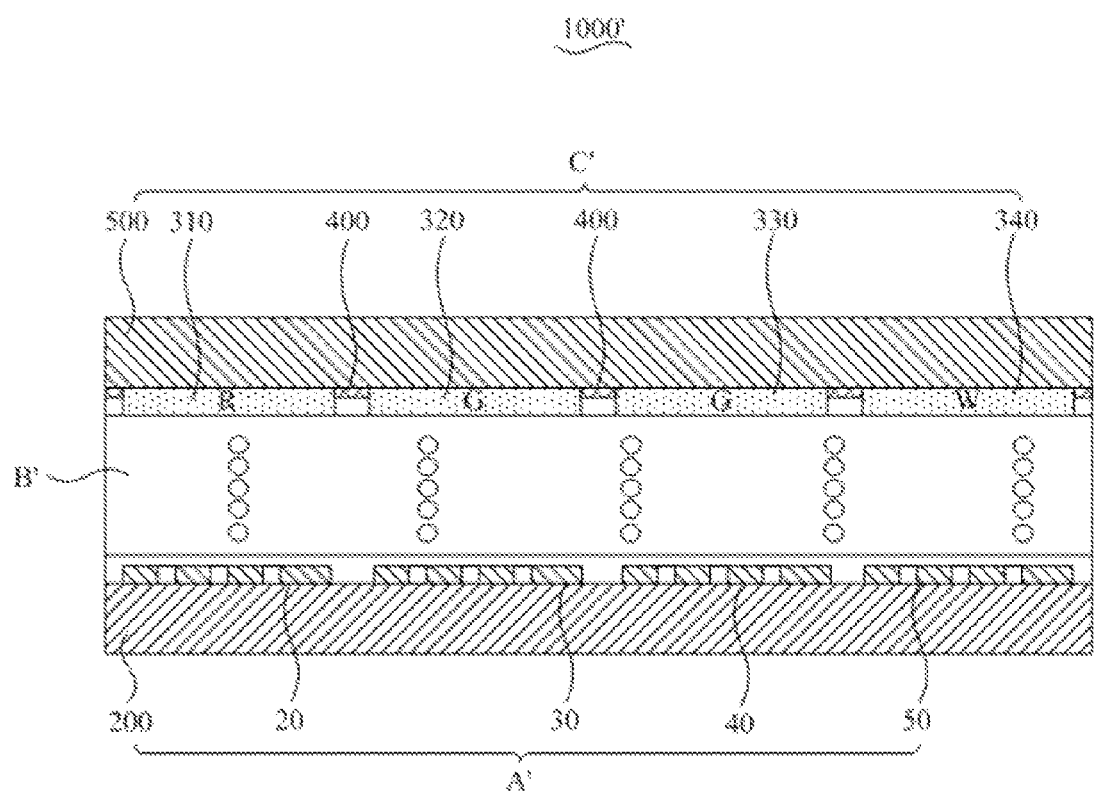
FIG. 6 is a schematic diagram showing the structure of a flat panel display according to a third embodiment of the present disclosure.

Referring to FIG. 6, a third embodiment of the present disclosure provides a flat panel display 1000', which includes an array substrate A', a liquid crystal layer B' and a color filter substrate C'.

The flat panel display 1000' has a structure similar to that of the flat panel display 1000 of the first embodiment, but is different in that: 1) the pixel unit in the array substrate A' includes four sub-pixels, including the first sub-pixel 20, the second sub-pixel 30 and the third sub-pixel 40 described in the first embodiment, as well as an additional fourth sub-pixel 50; and 2) the color filter substrate C' includes four color resists, including the red resist 310, the green resist 320 and the blue resist 330 described in the first embodiment, as well as a white color resist 340 which corresponds to the fourth sub-pixel 50.

For the flat panel display 1000' provided by the third embodiment of the present disclosure which operates by the same principle as the first embodiment, the optical compensation is performed by adjusting the thickness of the each of the color resists 310, 320 and 330 in the color filter substrate C' to avoid the color shift, without adjusting the thickness of the white resist 340.

The present disclosure further provides another pixel unit of a different structure within the array substrate of the flat panel display. All the sub-pixels included in the pixel unit each have same area, regardless of whether all the sub-pixels correspond to the same number of through grooves or not, in this case, the through grooves may have different sizes. The array substrate composed of such pixel units is also suitable for the optical compensation that is performed by adjusting the thicknesses of color resists in the present disclosure, in order to avoid the color shift phenomenon.

It is obvious that modifications and variations may be made to the present invention by those skilled in the art without departing from the concept and scope of the present invention. As such, if these modifications and variations to the present invention are within the scope defined by the claims of the present invention and equivalents thereof, then the present invention is also intended to include these modifications and variations.

What is claimed is:

1. A flat panel display comprising:
   an array substrate;
   a color filter substrate disposed opposite to the array substrate;
   a layer of liquid crystals disposed in between the array substrate and the color filter substrate;
   wherein the array substrate comprises:
   a common electrode and
   a plurality of pixel units disposed on the array substrate surface facing the color filter substrate and insulated from each other by an insulating layer, wherein each pixel unit comprises at least three sub-pixels, and the common electrode comprises a plurality of regions overlaying the respective sub-pixels, wherein the plurality of regions have different widths and each region comprises a plurality of through grooves having a same width, wherein a wider region includes more through grooves than a narrower region, wherein the sub-pixels in the wider region of the common electrodes have a higher aperture ratio than the sub-pixels in the narrower region; and
   wherein the color filter substrate comprises at least three resists which respectively correspond to the at least three sub-pixels, wherein a thickness of each of the at least three resists is adjusted according to the aperture ratio of each of the at least three sub-pixels and a ratio of transmittance of each of the at least three sub-pixels in such a way that ratios of transmittance of the at least three sub-pixels has a preset value to avoid a color shift phenomenon.

2. The flat panel display according to claim 1, wherein the pixel unit comprises four sub-pixels, first, second, third and fourth sub-pixels, and the color filter substrate comprises four resists, red, green, blue and white resists respectively corresponding to the first, second, third and fourth sub-pixels.

3. The flat panel display according to claim 1, wherein the aperture ratios of each of the at least three sub-pixels in the pixel unit are inversely related to the thickness of the at least three resists corresponding to the sub-pixels.

4. The flat panel display according to claim 3, wherein the thicknesses of the at least three resists corresponding to the sub-pixels in the pixel unit are inversely proportional to their transmittances.

5. The flat panel display according to claim 4, wherein the products of the transmittances of the at least three resists and the aperture ratios of the sub-pixels corresponding to the at least three resists have a fixed preset value.

6. The flat panel display according to claim 1, wherein a thickness of each of the at least three resists is inversely proportional to the transmittance of each of the at least three resists respectively.

* * * * *